(12) United States Patent
Wang et al.

(10) Patent No.: US 8,416,458 B2
(45) Date of Patent: Apr. 9, 2013

(54) ROTATED HALFTONE SCREEN GEOMETRY THAT AVOIDS BEAT-BASED BANDING

(75) Inventors: Shen-ge Wang, Fairport, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 713 days.

(21) Appl. No.: 12/612,197

(22) Filed: Nov. 4, 2009

(65) Prior Publication Data

US 2011/0102847 A1    May 5, 2011

(51) Int. Cl.
*H04N 1/405* (2006.01)

(52) U.S. Cl.
USPC ........................................ 358/3.06; 358/3.26

(58) Field of Classification Search .................. 358/3.06, 358/3.26
See application file for complete search history.

(56) References Cited

U.S. PATENT DOCUMENTS

| | | | |
|---|---|---|---|
| 4,537,470 A | 8/1985 | Schoppmeyer | |
| 4,758,886 A | 7/1988 | Rylander | |
| 5,323,245 A | 6/1994 | Rylander | |
| 5,371,612 A | 12/1994 | Sakamoto | |
| 5,381,247 A | 1/1995 | Hains | |
| 5,583,660 A | 12/1996 | Rylander | |
| 6,798,539 B1 | 9/2004 | Wang et al. | |
| 2002/0089708 A1 | 7/2002 | Cheng et al. | |
| 2003/0035145 A1 | 2/2003 | Wang | |
| 2003/0081256 A1 | 5/2003 | Wang et al. | |
| 2004/0109184 A1 | 6/2004 | Ishii | |
| 2006/0170975 A1 | 8/2006 | Wang | |
| 2006/0232822 A1* | 10/2006 | Wang et al. | 358/3.26 |
| 2008/0130054 A1 | 6/2008 | Wang et al. | |
| 2008/0130055 A1 | 6/2008 | Wang et al. | |
| 2008/0130056 A1 | 6/2008 | Wang et al. | |

OTHER PUBLICATIONS

U.S. Appl. No. 12/473,819, filed May 28, 2009, Loce et al.
Wang et al., "Uniform-Rosette Color Halftoning for N-Color Moiré-Free Printing," Journal of Electronic Imaging, Apr.-Jun. 2008/vol. 17(2), NY, USA.
Wang et al., "Non-Orthogonal Halftone Screens," IS&T NIP 2002, NY, USA.
Blatner et al., "Real World Scanning and Halftones," Peach Pit Press, 1998, p. 280.
Amidror et al., "Spectral Analysis and Minimization of Moiré Patterns in Color Separation," Journal of Electronic Imaging, vol. 3, No. 3, pp. 295-317, Jul. 1994.

* cited by examiner

*Primary Examiner* — Charlotte M Baker
(74) *Attorney, Agent, or Firm* — Fay Sharpe LLP (57) ABSTRACT

Disclosed are methods and apparatus for reproducing an image using one or more halftone screens for one or more respective colorants in the methods and apparatus reducing the beating of one or more excitation frequencies with one or more harmonic frequencies associated with the halftone screens. According to an exemplary method, one or more halftone screens are selected such that the fundamental frequency of an excitation frequency coincides with a harmonic frequency of a halftone screen.

25 Claims, 6 Drawing Sheets

ROTATED HALFTONE SCREEN GEOMETRY THAT AVOIDS BEAT-BASED BANDING

CROSS REFERENCE TO RELATED PATENTS AND APPLICATIONS

The following patents and patent applications are incorporated herein by reference in their entirety.

U.S. Patent Application Publication No. 2006/0232822 A1, by Wang et al., entitled "ANGLE AVOIDANCE FOR COLOR HALFTONE SCREENS," published Oct. 19, 2006.

U.S. Patent Application Publication No. 2008/0130055 A1, by Wang et al., entitled "MOIRÉ-FREE COLOR HALFTONE CONFIGURATION EMPLOYING COMMON FREQUENCY VECTORS," published Jun. 5, 2008.

U.S. Patent Application Publication No. 2008/0130054 A1, by Wang et al., entitled "N-COLOR PRINTING WITH HEXAGONAL ROSETTES," published Jun. 5, 2008.

U.S. Pat. No. 6,798,539, by Wang et al., entitled "METHOD FOR MOIRÉ-FREE COLOR HALFTONING USING NON-ORTHOGONAL CLUSTER SCREENS," issued Sep. 28, 2004.

U.S. patent application Ser. No. 12/473,819, by Loce et al., entitled "TWO-DIMENSIONAL ROS EMITTER GEOMETRY WITH LOW BANDING SENSITIVITY," filed May 28, 2009.

BACKGROUND

Digital imaging systems, including, for example, ink jet, electrophotographic and xerographic printing or rendering environments can include a number of intentional and unintentional periodicities in their rendering processes. For example, many raster output scanners (ROS) associated with electrophotographic and xerographic marking engines include a rotating polygonal mirror as part of a motor polygon assembly (MPA). One or more laser beams are reflected off of facets of the rotating mirror onto an imaging surface. Imperfections in the mirrors, alignment of the rotating mirror and facets, and the rate at which the mirror is rotated can affect the position, intensity and focus of the reflected beam with the periodicity of the mirror rotation. The cyclic nature of gears associated, for example, with moving an ink jet print head or with transporting print media, can also contribute periodicities to some rendering processes. Additionally, where print media is transported by or processed by rolls, roll run-out or imperfections in the shape or alignment of the rolls can contribute periodic variations in the rendering process. For instance, roll run-out imperfections may create variation to development pressure and/or in-media transportation speed. Furthermore, subtle accelerations and decelerations are associated with points in time of positive gear-tooth engagement and disengagement (or backlash).

In the best of situations, these periodic excitations due to problematic rendering processes occur at frequencies that are high enough to be imperceptible by the human vision system. However, even excitations that are themselves at an imperceptively high frequency can combine or beat with other imaging periodicities to produce perceptible banding or moiré artifacts in a rendered image. For example, problematic rendering excitations can combine with fundamental, harmonic and beat frequencies associated with halftone screens used in the rendering process.

In monochrome or black and white rendering applications, where only one halftone screen is used, it is fairly simple to select a halftone screen that does not include periodicities (i.e., fundamental, harmonic and beat frequencies) in the same direction or at the same angle as one or more known problematic excitations. However, in color rendering, where two or more halftone screens are used (one for each separation), it is difficult to find a set of halftone screens that avoid including periodicities (i.e., fundamentals, harmonics and beats) in the same direction or angle of a problematic excitation.

In fact, a great deal of effort has been spent to solve the lesser problem of finding sets of halftone screens for rendering color that do not produce objectionable moiré due to beats between frequency components of the screens themselves. For example, see Spectral Analysis and Minimization of Moire Patterns in Color Separation by Amidror, Hersch and Ostromoukhov in the Journal of Electronic Imaging, Vol. 3, no. 3, pages 295-317 (July 1994); U.S. Pat. No. 5,381,247 to Hains for a Method for Reducing Two-Color Moire in Four-Color printing, which issued Jan. 10, 1995; U.S. Pat. No. 4,537,470 to Schoppmeyer for Screen Systems for Multicolor Printing, which issued Aug. 27, 1985; and U.S. Pat. No. 6,798,539 B1 to Wang, et al. for a method for moire-free color halftoning using non-orthogonal cluster screens, which issued Sep. 28, 2004.

Halftone banding has been a long standing problem for digital printers, and it can be one of the most serious image quality problems. Banding can be placed into two categories. One type of banding is due to the excitation frequency from the mechanical or opto-mechanical being directly observable as a spatial frequency on the final print. A second type of banding is due to halftone periodic structure beating with a machine excitation frequency to produce a new frequency that is observed on a print. For example, a beat may occur between a frequency component of a halftone screen or combination of halftone screens and a harmonic of a ROS MPA once-around frequency.

Periodic excitations from the marking process are typically periodic in the process direction. However, periodic excitations can also exist in the cross-process direction and can occur from a variety of sources, such as segmented photoreceptor charging devices or segmentation imaging devices such as an LED image bar array. Regarding process direction excitations, in past studies, it has been determined that lowering the amplitude of beat-type banding sometimes can be accomplished by rotating a halftone screen so that its harmonics are a small amount off of the 90° axis, i.e., process-direction. For example, 2° has worked for some screens and a monochrome screen with this property has been used in previous printers and patent application publication No. 2006/0232822 discloses this principle applied to process-color screen sets. Notably, it has been discovered that small angle rotations do not always reduce banding amplitude, and it is difficult to find screen geometries that have this slight rotation.

For the beat-based banding case, it has been discovered that using a screen set with a nonrotated (0°/90° fundamental frequencies) screen can solve beat-based banding in some printing systems. One disadvantage associated with this approach is customer dissatisfaction with a screen being at 0°/90°. Notably, low raster resolution (600 spi) printers have not been able to produce a screen set that solves the problem without using a 0°/90° screen or more complicated supercell designs.

INCORPORATION BY REFERENCE

The following references are incorporated herein by reference in their entirety.

U.S. Pat. No. 4,537,470, by Schoppmeyer, entitled "SCREEN SYSTEMS FOR MULTICOLOR PRINTING," issued Aug. 27, 1985.

U.S. Pat. No. 4,758,886, by Rylander, entitled "OPTIMAL COLOR HALF-TONE PATTERNS FOR RASTER-SCAN IMAGES, issued Jul. 19, 1988.

U.S. Pat. No. 5,323,245, by Rylander, entitled "PERPENDICULAR, UNEQUAL FREQUENCY NON-CONVENTIONAL SCREEN PATTERNS FOR ELECTRONIC HALFTONE GENERATION," issued Jun. 21, 1994.

U.S. Pat. No. 5,371,612, by Sakamoto, entitled "METHOD OF AND APPARATUS FOR FORMING HALFTONE IMAGES," issued Dec. 6, 1994.

U.S. Pat. No. 5,381,247, by Hans, entitled "METHOD FOR REDUCING TWO-COLOR MOIRÉ IN FOUR-COLOR PRINTING, issued Jan. 10, 1995.

U.S. Pat. No. 5,583,660, by Rylander, entitled "NON-PERPENDICULAR, EQUAL FREQUENCY NON-CONVENTIONAL SCREEN PATTERNS FOR ELECTRONIC HALFTONE GENERATION," issued Dec. 10, 1996.

U.S. Patent Publication No. 2006/0170975, by Wang, entitled "MOIRE-FREE COLOR HALFTONE CONFIGURATION," published Aug. 3, 2006.

U.S. Patent Publication No. 2004/0109184, by Ishii, entitled "IMAGE FORMING APPARATUS AND METHOD THEREOF," published Jun. 10, 2004.

U.S. Patent Application Publication No. 2002/0089708, by Cheng et al. entitled "HALFTONING USING DOT AND LINE SCREENS TO AVOID TWO AND THREE COLOR MOIRE," published Jul. 11, 2002.

U.S. Patent Application Publication No. 2003/0035145, by Wang, entitled "METHOD FOR FOUR-COLOR ZERO-MOIRE HALFTONING," published Feb. 20, 2003.

U.S. Patent Application Publication No. 2003/0081256, by Wang et al., entitled "METHOD OF DESIGNING HALFTONE SCREENS USING NON-ORTHOGONAL SUPERCELLS," published May 1, 2003.

U.S. Patent Application Publication No. 2008/0130056, by Wang et al., entitled "ROSETTE PRINTING WITH UP TO FIVE COLORS," published Jun. 5, 2008.

"Non-orthogonal Halftone Screens", by S. Wang, IS&T NIP2002.

"*Real World Scanning and Halftones*," by David Blatner, Glen Fleischman, and Steve Roth, Peach Pit Press, 1998, page 280.

Spectral Analysis and Minimization of Moiré Patterns in Color Separation," by Amidror, Hersch and Ostromoukhov, the Journal of Electronic Imaging, Vol. 3, no. 3, pages 295-317 (July 1994).

BRIEF DESCRIPTION

In one embodiment of this disclosure, described is a method for reproducing an image using one or more halftone screens for one or more respective colorants associated with an image rendering device and the method preventing the beating of one or more excitation frequencies with one or more harmonic frequencies associated with the halftone screens, the method comprising a) identifying one or more excitation frequencies associated with one or more of the image and the image rendering device; b) selecting the one or more halftone screens such that one or more of the fundamental frequencies of the excitation frequencies substantially coincide with at least one of the harmonic frequencies of the one or more halftone screens; and c) generating a halftone representation of the image using the selected halftone screens.

In another embodiment of this disclosure, described is a computer program product comprising a computer-usable data carrier storing instructions that, when executed by a computer, cause the computer to perform a method for reproducing an image using one or more halftone screens for one or more colorants associated with an image rendering device, and the method preventing the beating of one or more excitation frequencies with one or more harmonic frequencies associated with the halftone screens, the method comprising a) identifying one or more excitation frequencies associated with one or more of the image and the image rendering device; b) selecting the one or more halftone screens such that one or more of the fundamental frequencies of the excitation frequencies substantially coincide with at least one of the harmonic frequencies of the one or more halftone screens; and c) generating a halftone representation of the image using the selected halftone screens.

In yet another embodiment of this disclosure, described is a printing apparatus comprising an image marking device for rendering an image on a media substrate; and a controller configured to receive a representation of an image for rendering on the image marking device, the controller configured to perform a method for reproducing the image using one or more halftone screens for one or more colorants associated with the image marking device, and the method preventing the beating of one or more excitation frequencies with one or more harmonic frequencies associated with the halftone screens, the method comprising: a) identifying one or more excitation frequencies associated with one or more of the image and the image rendering device; b) selecting the one or more halftone screens such that one or more of the fundamental frequencies of the excitation frequencies substantially coincide with at least one of the harmonic frequencies of the one or more halftone screens; and c) generating a halftone representation of the image using the selected halftone screens.

DETAILED DESCRIPTION

Disclosed are exemplary methods and apparatus including a halftoning methodology that avoids banding due to rotated halftones beating with periodic frequencies that occur in a printer. The methodology operates by selecting and utilizing halftone screen sets that obey specified frequency relationships between the halftone structure and excitation frequencies within the printer. In particular, halftone fundamental frequencies are selected such that the fundamental frequency of an excitation frequency coincides with a harmonic frequency of a halftone screen. The halftone/printer configuration avoids banding because the interaction of a frequency with an integer multiple of itself does not generate non-zero low-frequency beating. The present disclosure focuses on rotated screens and screen sets that utilize this concept.

One desirable feature of the disclosed embodiments is a halftone screen should be free of objectionable moiré to avoid banding. US Patent Publications 2008/130055, and 2008/0130054, U.S. Pat. No. 6,798,539 and "Non-orthogonal Halftone Screens" by S. Wang provide methods for designing moiré-free halftone screen sets that can be used according to the present disclosure. Note that other traditional moiré-free design methods may be used and are within the scope of this disclosure, but the methods of US Patent Publications 2008/130055, and 2008/0130054, U.S. Pat. No. 6,798,539 and "Non-orthogonal Halftone Screens" by S. Wang yield halftone screen sets with well-behaved harmonics and beats, making the present design process simpler and less prone to spurious, unpredicted banding.

One aspect of the methods and apparatus disclosed for reducing banding is the recognition of at least one excitation frequency that will be present in a printing apparatus, and selection of rotated screen geometries that are compatible with that frequency. In particular, the screen geometry requires the following properties:

1. Moiré-free design: The screen geometry is restricted to moiré-free designs, preferably the use of moiré-free designed screens previously discussed because of their well-behaved harmonics and beats.

2. All fundamental frequencies are rotated off axis: All fundamental frequencies are rotated at least 5° off of the 90° axis (process direction), and preferably at least 10° off of the 90° axis. Hence, the screen set will have a different appearance than the screens of U.S. Patent Application Publication No. 2006/0232822.

3. Either one of the following:
   At least one harmonic of a halftone screen coincides with an excitation frequency along the process-direction axis.
   At least one frequency due to a combination of screens coincides with an excitation frequency along the process-direction axis. The combination can be of two or more screens, and the combination could be of screen fundamental frequencies or harmonics.

Some specific embodiments disclosed include the following:
   Halftones having a harmonic relationship with specific VCSEL (Vertical Cavity Surface Emitting Laser) ROS frequencies of interest. VCSELs are used as multibeam light source in laser scanners, where the multiple sources are typically arrayed in a two-dimensional parallelogram pattern. There are two important VCSEL frequencies that have the potential to produce banding: Swath-to-swath frequency, and 2D rotation error frequency (see U.S. patent application Ser. No. 12/473,817 filed on May 28, 2009).
   Halftones having a harmonic relationship with other printer frequencies of interest. The harmonic relationship may be most important for relatively high frequencies, much less than 1" periods. Any frequency source within the printer that is in a relatively high frequency range is a candidate for this type of design. An example is gear tooth noise from any of a number of gears within the photoreceptor and transport mechanisms.
   Halftones having a harmonic relationship with frequencies that are within an image.
   Different numbers of screens.

EXAMPLE

Consider an excitation frequency that may be a problem range for a printer's halftones: 120 cpi (cycles per inch). This frequency is being selected for simplicity of demonstration only, and the disclosed methodologies apply to other frequencies as well.

Next, assume a screen set is needed with fundamental frequencies in the 175 to 200 cpi range. It is also desirable to have one screen rotated near 45° and all fundamental frequencies at least 5° from the axes, so as to have a rotated appearance.

An existing "200 cpi" screen demonstrates the beating problem and clarifies that the screens may have an undesirable characteristic that can be avoided with the disclosed methods and apparatus. For example, a 200 cpi cyan, magenta, and black set of screens has the following specifications:

$V_{c1}$=213.6 cpi@20.6°

$V_{c2}$=200.7 cpi@-48.4°

$V_{m1}$=200.7 cpi@48.4°

$V_{m2}$=213.6 cpi @-20.6°

$V_{k1}$=150.0 cpi@90°

$V_{k2}$=266.7 cpi@0° where $V_{ij}$ is a fundamental frequency vector, i is the colorant, and j is 1 for vectors in the $1^{st}$ quadrant and 2 for vectors in the $4^{th}$ quadrant. Note that there are alternate and equivalent representations for screen specifications, including different sign conventions, use of conjugate vectors, spatial vectors, etc.

Figure 1:
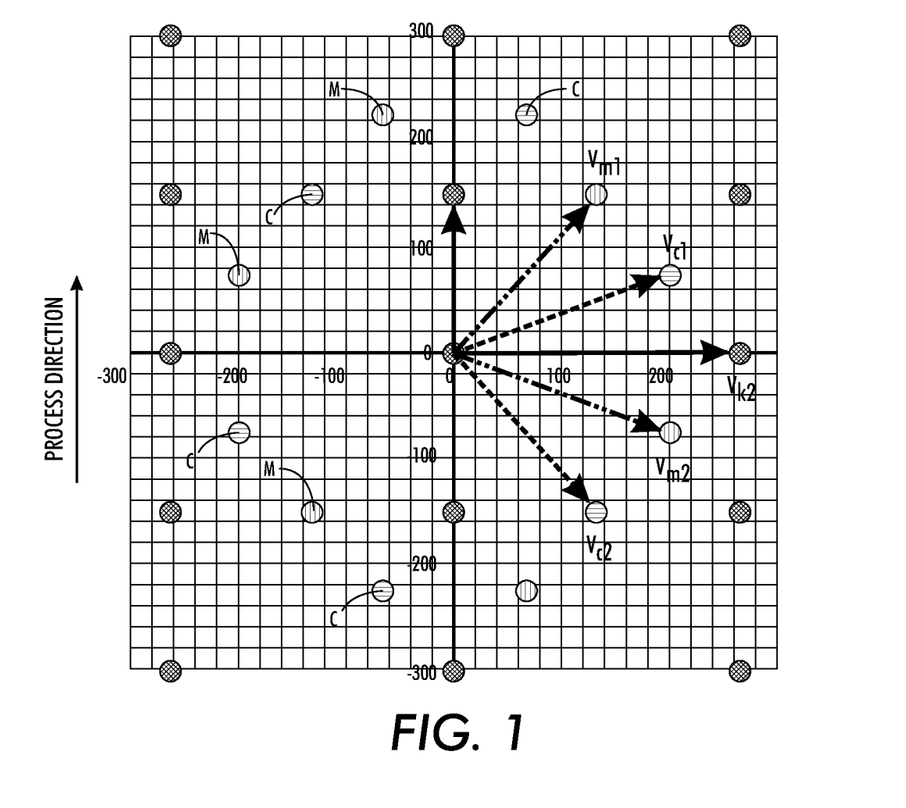
FIGS. 1 and 2 are frequency domain representations of a screen set and excitation frequency according to an existing image halftoning configuration.
Figure 2:
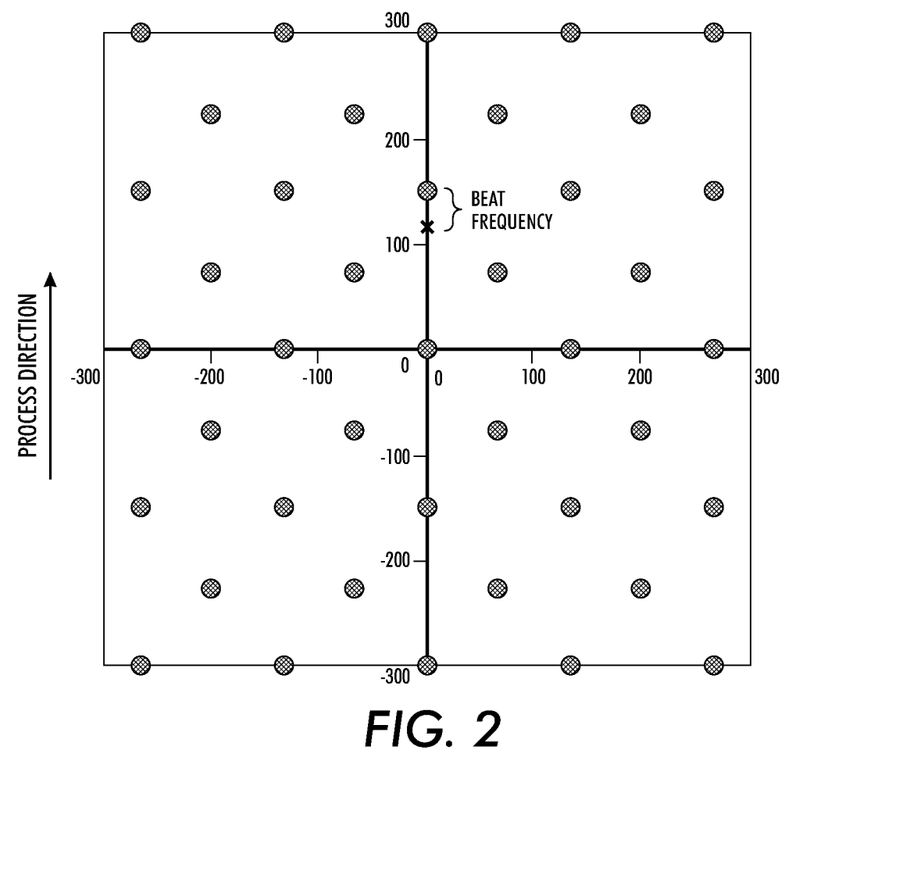
Figure 3:
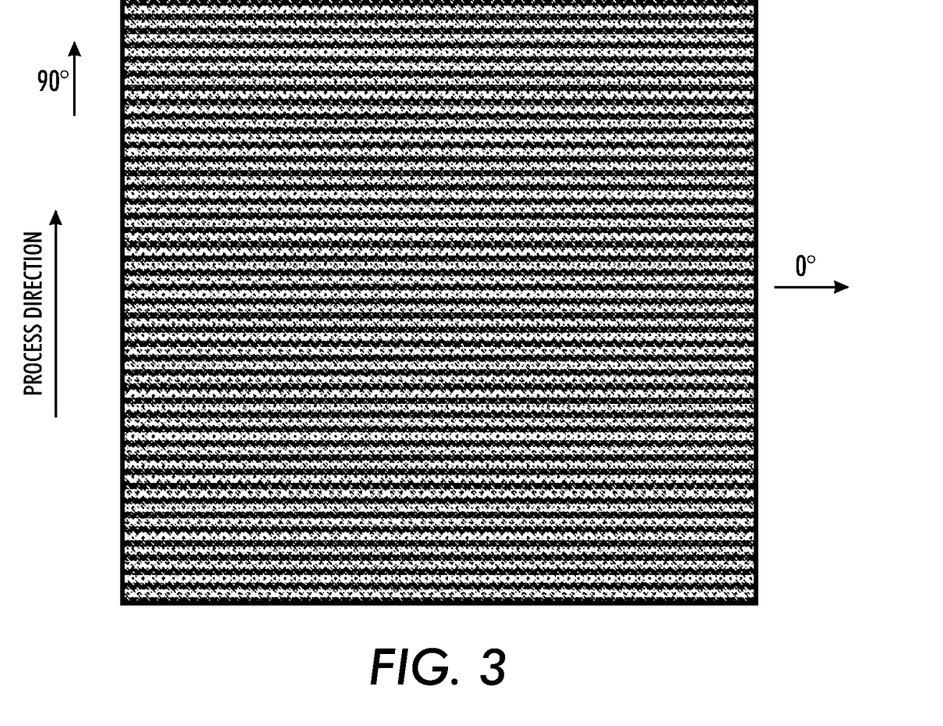
FIG. 3 illustrates the screen set of FIGS. 1 and 2, including the resultant beat.

While this set addresses a particular beating problem (not shown here), print consumers sometimes find the appearance of a 0°/90° screen undesirable for some image subject matter. A frequency domain representation of this configuration and the example excitation frequency (x) are shown in FIGS. 1 and 2. Notice that the harmonics of the screen set along the process-direction axis (vertical) are not an integer multiple of the excitation frequency. The difference (150 cpi–120 cpi=30 cpi) produces an objectionable beat. This screen set and the objectionable beat are shown in FIG. 3.

Given a high resolution (addressability) imaging system, such as a VCSEL ROS imager, design of a screen according to the rules presently disclosed is possible. Consider the following example:

$V_{c1}$=182.5 cpi@9.5°

$V_{c2}$=161.6 cpi@-68.2°

$V_{m1}$=161.6 cpi@68.2°

$V_{m2}$=182.5 cpi@-9.5°

$V_{k1}$=169.7 cpi @45°

$V_{k2}$=169.7 cpi@-45°.

Figure 4:
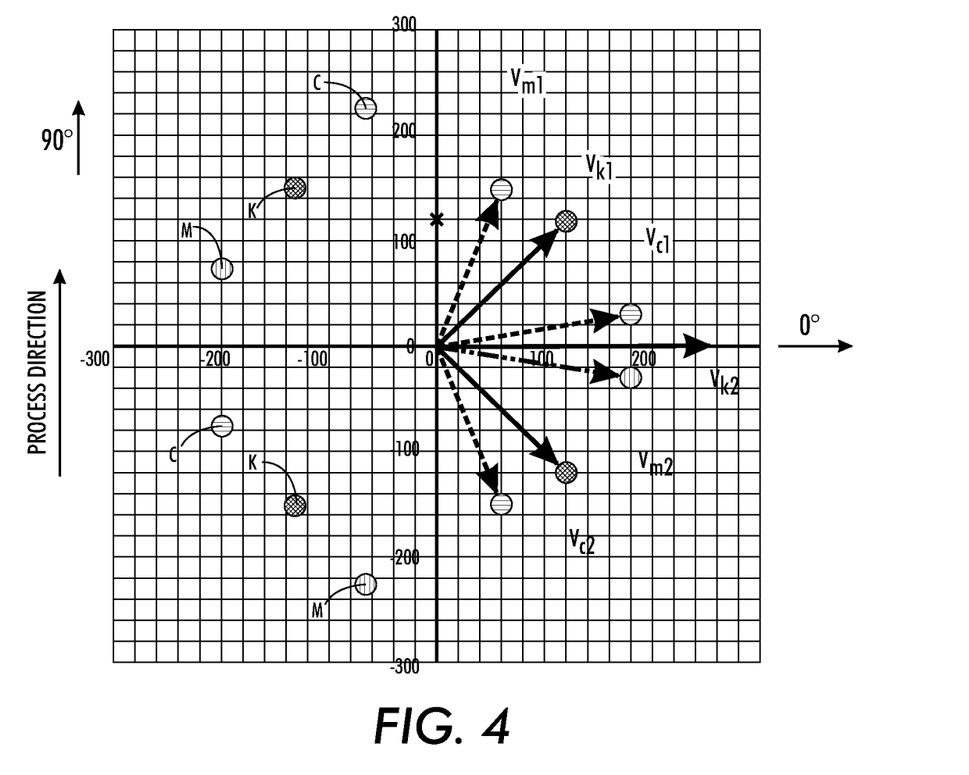
FIGS. 4 and 5 are frequency domain representations of a screen and excitation frequency according to an exemplary embodiment of this disclosure.
Figure 5:
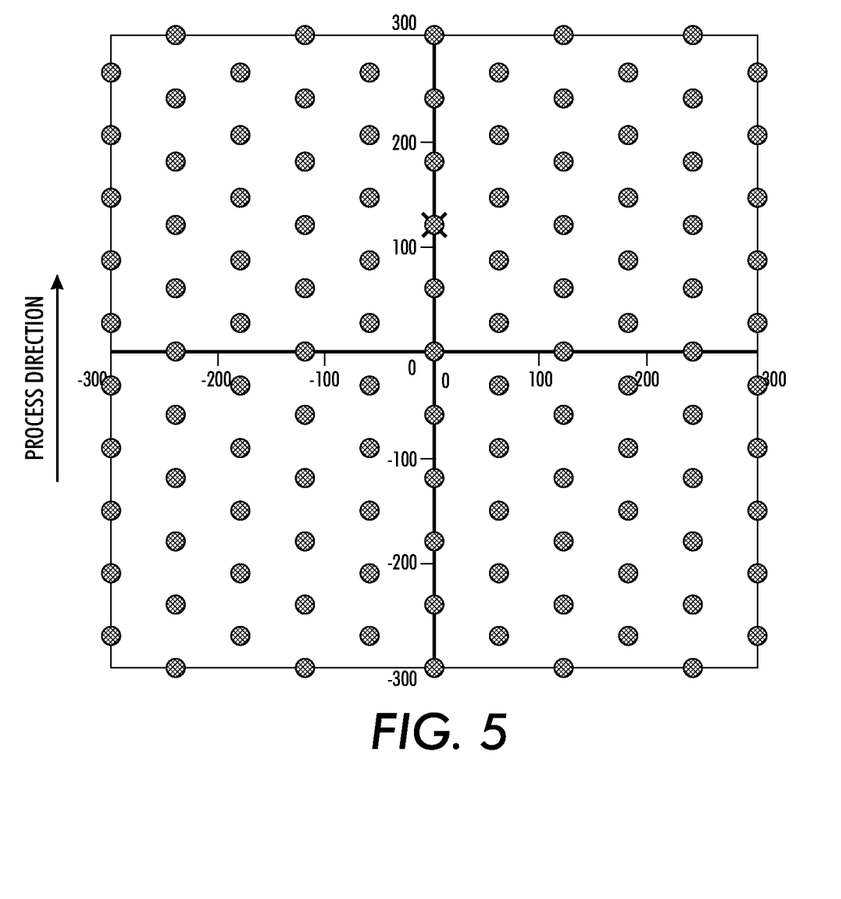

A frequency domain representation of this configuration and the excitation frequency are shown in FIGS. 4 and 5. Notice that at least one harmonic of the screen set along the process-direction axis (vertical) is coincident with the excitation frequency and no other halftone screen set harmonics are near the excitation frequency in the frequency domain. No objectionable beat will be produced.

Figure 6:
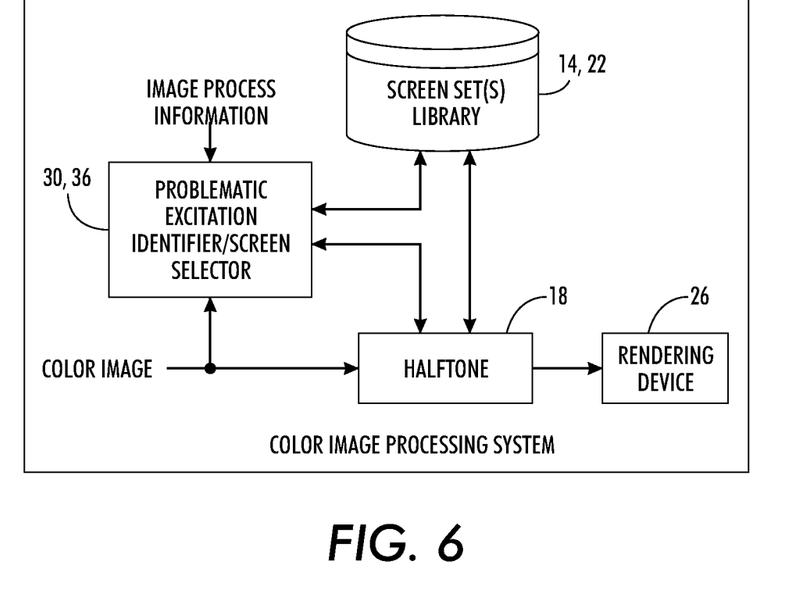
FIG. 6 is a block diagram of a color image processing system.

Referring to FIG. 6, a color image processing system that is operative to halftone a color image in a manner that avoids objectionable moiré and banding associated with a problematic excitation is disclosed. The system includes a set 14 of halftone screens that include at least one harmonic frequency coinciding with the problematic excitation frequency, and a halftoner 18 that is operative to prepare the color image for rendering via a rendering device using the set of halftone screens 14. For example, the set of halftone screens 14 may include a plurality or library 22 of halftone screen sets. Alternatively, the set of halftone screens 14 may be the only set included in the system.

The set 14 of screens can also include additional screens. For example, the set 14 can include a third or a plurality of additional screens. In those cases, at least one harmonic of the respective first, second and third or plurality of screens are coincident with the problematic excitation frequency.

Optionally, the color image processing system 14 may include a rendering device 26 and/or a problematic excitation identifier 30 and screen selector 36.

For instance, the rendering device 26 can include one or more marking engines, such as, for example, ink jet, electrophotographic or xerographic marking engines. Additionally, or alternatively, the rendering device 26 can include one or more display devices, such as cathode ray tubes (CRTs), liquid crystal displays (LCDs) and/or plasma displays. Where the color image processing system includes a rendering device 26, the screen set 14 can be selected from screens identified to be compatible with an identified pixel grid of the rendering device 26. Where the system does not include a rendering device, the screen set 14 or library of screen sets 22 can be included in the color image processing system in anticipation of potential available pixel grid resolutions, such as, for example, 600 spi, 1200 spi and 2400 spi, where spi refers to spots per inch, i.e. pixels per inch.

The problematic excitation identifier 30 can be operative to identify the problematic excitation from an aspect of the image process, rendering device or from the color image itself. For example, the problematic excitation identifier 30 may receive input from a system designer or system operator indicating aspects of the problematic excitation. Alternatively, the problematic excitation identifier 30 may orchestrate the production and analysis of test prints for identifying problematic excitations associated with the image processing system or rendering device (e.g., 26). Additionally, or alternatively, the problematic excitation identifier 30 may examine color image data and identify a problematic excitation within the color image itself. For instance, the problematic excitation identifier 30 may analyze subject matter of the image in a search for problematic excitations, such as repeated patterns in the subject matter of the image. If, or when, the problematic excitation identifier 30 identifies a problematic excitation, it may pass problematic excitation identification information to the screen selector 36.

The screen selector 36 may be operative to select a set of screens (e.g., 14) from the library 22 of screen sets based on the identification of the problematic excitation provided by the problematic excitation identifier 30.

The screen set 14 or library 22 may be implemented in any known computer storage medium such as rotating media, random access memory (RAM), read only memory (ROM), EEPROM, FLASH or other devices.

The halftoner 18, the problematic excitation identifier 30 and the screen selector 36 may be implemented in various combinations of hardware and software.

Identifying the available pixel grid may occur when a marking engine is selected for rendering the image. This may occur at system design time, commissioning, or when image or document production is scheduled. For instance, an image processing system may include a plurality of marking engines with different capabilities and different available pixel grids.

Identifying screens that are compatible with the available pixel grid can include identifying halftone screens that have structures that align with the spots that can be rendered by the available pixel grid. For instance, spots or pixel positions within a halftone cell of a candidate screen must align with markable pixel positions associated with the available pixel grid. More screens will be compatible with a pixel grid having a resolution of 2400 spots per inch than will be compatible with a 600 spot per inch pixel grid.

Screens of any geometry may be considered including, but not limited to, line screens and dot screens. However, it may be beneficial to identify screens that are compatible with the available pixel grid and have additional desirable characteristics. For instance, screens that include fundamental frequencies below about 100 cpi begin to be perceivable by the human vision system. While low-frequency screens may be selected for artistic or other reasons, it may be beneficial to limit the identified screens to those that include fundamental frequency components above some threshold or to otherwise limit the pool of candidate screens.

According to one exemplary embodiment, a moiré-free color halftone configuration employing common frequency vectors, as described in U.S. patent application publication No. 2008/0130054, includes an image forming method for digitally reproducing a moiré-free color halftone image using an enhanced halftone screen set consisting of a halftone screen for each of N colorants. The method comprises defining rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1}\pm V_{R2}|>f_{min}$; defining N halftone screens for colorants i=1, N, respectively possessing first and second frequency vectors ($V_{i1}$, $V_{i2}$), where no two screens possess identical fundamental frequency vector pairs; and selecting fundamental frequency vectors for the N halftone screens according to $(V_{i1}, V_{i2})=(m_{i1}V_{R1}+m_{i2}V_{R2}, n_{i1}V_{R1}+n_{i2}V_{R2})$ for integer m's and n's, where at least one fundamental frequency vector or its conjugate must also satisfy one of the following: $V_{ik}=V_{R1}$, $V_{ik}=V_{R2}$, and $|V_{ik}|>2 \max[|V_{R1}|, |V_{R2}|]$; so that the set of N different halftone screens used in combination produce moiré-free halftone output.

As previously mentioned, one desirable feature of the disclosed methods and apparatus for avoiding beating of one or more excitation frequencies with one or more harmonic frequencies associated with the halftone screens is the additional requirement that halftone screens be selected to be free of objectionable moiré to avoid banding.

As discussed in U.S. Patent Application Publication No. 2008/0130054, the image forming method utilizes an arbitrary number of clustered-dot screens in an exemplary configuration to achieve halftone outputs with uniform rosettes that appear as tiled hexagons all of identical shape and are free of moiré. Certain conditions must be satisfied for such outputs and they can be specified either in the spatial domain, where shapes of halftone cells for different colors are defined by spatial vectors, or in the frequency domain, where halftone screens are specified by frequency vectors.

The halftoning method, and resulting configuration, are based on defining rosette fundamental frequency vectors of sufficiently high frequency and angle separation that can be used to generate a hexagonal lattice of rosette harmonics. The lattice is generated by linear combinations of the rosette fundamental frequency vectors. Angles and frequencies for individual halftone screens are chosen from the rosette lattice points. A screen set selected in such a manner is moiré free because no combination of frequency lattice points can produce a beat lower than the two rosette frequency vectors used to generate the lattice. The lattice structure defined by the rosette makes it possible to choose pairs of frequency vectors for an almost arbitrary number of colorants without introducing any moiré in an N-color combination. Practical frequency lattices can be realized through the use of nonorthogonal screens. A mathematical statement of the general principle of N-halftone lattice-based screen configurations can be written by considering a frequency lattice structure defined by rosette vectors $V_{R1}$, $V_{R2}$. To avoid objectionable low frequency texture and moiré we require $$|V_{R1}|>f_{min}, |V_{R2}|>f_{min}, \text{ and } |V_{R1}\pm V_{R2}|>f_{min}. \quad (4)$$

Typically, to meet visual acceptability standards, $f_{min}$ can be set to be approximately 100 cycles/inch. But, lower quality printed material could use $f_{min}$ as low as 50 cycles/inch, or perhaps lower, while high quality printed material might require $f_{min}$=150 cycles/inch.

For a screen configuration with N halftone screens, let $V_{i1}$, $V_{i2}$ respectively denote first and second fundamental frequency vectors for screens i=1, 2, ..., N, where $V_{i1}$, $V_{i2}$ are chosen to satisfy $$(V_{i1}, V_{i2})=(m_{i1}V_{R1}+m_{i2}V_{R2}, n_{i1}V_{R1}+n_{i2}V_{R2}) \text{ for integer m's and n's.} \quad (5)$$

Exemplary halftone configurations are generated by utilizing configurations where at least one halftone fundamental frequency vector $V_{ik}$ deviates from occurring on the second-order spectral hexagon. Deviation from the second-order spectral hexagon can be specified by requiring at least one fundamental frequency vector or its conjugate to satisfy one of the following: $V_{ik}=V_{R1}$, $V_{ik}=V_{R2}$, and $|V_{ik}|>2\max[|V_{R1}|, |V_{R2}|]$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for reproducing an image using one or more halftone screens for one or more respective colorants associated with an image rendering device and the method preventing the beating of one or more excitation frequencies with one or more harmonic frequencies associated with the halftone screens, the method comprising:
    a) identifying one or more excitation frequencies associated with one or more of the image and the image rendering device;
    b) selecting the one or more halftone screens such that one or more of the fundamental frequencies of the excitation frequencies substantially coincide with at least one of the harmonic frequencies of the one or more halftone screens; and
    c) generating a halftone representation of the image using the selected halftone screens.

2. The method according to claim 1, wherein the method reproduces a color image using two or more halftone screens for two or more respective colorants associated with the image rendering device, and step b) comprises:
    selecting the two or more halftone screens such that one or more of the fundamental frequencies of the excitation frequencies substantially coincide with at least one of the harmonic frequencies of the two or more halftone screens.

3. The method according to claim 2, step a) further comprising:
    identifying one or more of the process direction and cross-process direction excitation frequencies associated with the image rendering device.

4. The method according to claim 1, step b) further comprising:
    selecting the one or more halftone screens such that the fundamental frequencies of the one or more halftone screens are not coincident with at least one of the excitation frequencies.

5. The method according to claim 1, wherein the halftone screens are non-orthogonal and selected to produce a substantially moiré-free halftone representation of the image.

6. The method according to claim 5, wherein the method reproduces an image using an enhanced halftone screen set including N halftone screens for each of N respective colorants associated with the image rendering device, and step b) further comprises:
    selecting a halftone screen set, the halftone screen set generated according to a method comprising:
        defining rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1}\pm V_{R2}|>f_{min}$;
        defining N halftone screens for colorants i=1, N, respectively possessing first and second frequency vectors $(V_{i1}, V_{i2})$, where no two screens possess identical fundamental frequency vector pairs; and
        selecting fundamental frequency vectors for the N halftone screens according to $(V_{i1}, V_{i2})=(m_{i1}V_{R1}+m_{i2}V_{R2}, n_{i1}V_{R1}+n_{i2}V_{R2})$ for integer m's and n's, where at least one fundamental frequency vector or its conjugate must also satisfy one of the following: $V_{ik}=V_{R1}$, $V_{ik}=V_{R2}$, and $|V_{ik}|>2\max[|V_{R1}|, |V_{R2}|]$; so that the set of N different halftone screens used in combination produce moiré-free halftone output.

7. The method according to claim 1, step a) comprising:
    identifying the one or more excitation frequencies by performing one or more of receiving input from a user of the image rendering device, and analyzing test prints generated by the image rendering device.

8. The method according to claim 1, step a) comprising:
    identifying the one or more excitation frequencies by examining color image data associated with the image to identify repeated patterns.

9. The method according to claim 1, wherein the method reproduces a color image using two or more halftone screens for two or more respective colorants associated with a printer, and step b) comprises:
    selecting the two or more halftone screens such that the fundamental frequencies of the excitation frequencies substantially coincide with the harmonic frequencies of the two or more halftone screens, and the fundamental frequencies of the two or more halftone screens are not coincident with the excitation frequencies.

10. A computer program product comprising:
    a non-transitory computer-usable data carrier storing instructions that, when executed by a computer, cause the computer to perform a method for reproducing an image using one or more halftone screens for one or more colorants associated with an image rendering device, and the method preventing the beating of one or more excitation frequencies with one or more harmonic frequencies associated with the halftone screens, the method comprising:

a) identifying one or more excitation frequencies associated with one or more of the image and the image rendering device;
b) selecting the one or more halftone screens such that one or more of the fundamental frequencies of the excitation frequencies substantially coincide with at least one of the harmonic frequencies of the one or more halftone screens; and
c) generating a halftone representation of the image using the selected halftone screens.

11. The computer program product according to claim 10, wherein the method reproduces a color image using two or more halftone screens for two or more respective colorants associated with the image rendering device, and step b) comprises:
selecting the two or more halftone screens such that one or more of the fundamental frequencies of the excitation frequencies substantially coincide with at least one of the harmonic frequencies of the two or more halftone screens.

12. The computer program product according to claim 11, step a) further comprising:
identifying one or more of the process direction and cross-process direction excitation frequencies associated with the image rendering device.

13. The computer program product according to claim 10, step b) further comprising:
selecting the one or more halftone screens such that the fundamental frequencies of the one or more halftone screens are not coincident with at least one of the excitation frequencies.

14. The computer program product according to claim 10, wherein the halftone screens are non-orthogonal and selected to produce a substantially moiré-free halftone representation of the image.

15. The computer program product according to claim 14, wherein the method reproduces an image using an enhanced halftone screen set including N halftone screens for each of N respective colorants associated with the image rendering device, and step b) further comprises:
selecting a halftone screen set, the halftone screen set generated according to a method comprising:
defining rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1}\pm V_{R2}|>f_{min}$;
defining N halftone screens for colorants i =1, N, respectively possessing first and second frequency vectors ($V_{i1}$, $V_{i2}$), where no two screens possess identical fundamental frequency vector pairs; and
selecting fundamental frequency vectors for the N halftone screens according to $(V_{i1}, V_{i2})=(m_{i1}V_{R1}+m_{i2}V_{R2}, n_{i1}V_{R1}+n_{i2}V_{R2})$ for integer m's and n's, where at least one fundamental frequency vector or its conjugate must also satisfy one of the following: $V_{ik}=V_{R1}$, $V_{ik}=V_{R2}$, and $|V_{ik}|>2\max[|V_{R1}|, |V_{R2}|]$; so that the set of N different halftone screens used in combination produce moiré-free halftone output.

16. The computer program product according to claim 10, wherein the method reproduces a color image using two or more halftone screens for two or more respective colorants associated with a printer, and step b) comprises:
selecting the two or more halftone screens such that the fundamental frequencies of the excitation frequencies substantially coincide with the harmonic frequencies of the two or more halftone screens, and the fundamental frequencies of the two or more halftone screens are not coincident with the excitation frequencies.

17. A printing apparatus comprising:
an image marking device for rendering an image on a media substrate; and
a controller configured to receive a representation of an image for rendering on the image marking device, the controller configured to perform a method for reproducing the image using one or more halftone screens for one or more respective colorants associated with the image marking device, and the method preventing the beating of one or more excitation frequencies with one or more harmonic frequencies associated with the halftone screens, the method comprising:
a) identifying one or more excitation frequencies associated with one or more of the image and the image rendering device;
b) selecting the one or more halftone screens such that one or more of the fundamental frequencies of the excitation frequencies substantially coincide with at least one of the harmonic frequencies of the one or more halftone screens; and
c) generating a halftone representation of the image using the selected halftone screens.

18. The printing apparatus according to claim 17, wherein the method reproduces a color image using two or more halftone screens for two or more respective colorants associated with the image rendering device, and step b) comprises:
selecting the two or more halftone screens such that one or more of the fundamental frequencies of the excitation frequencies substantially coincide with at least one of the harmonic frequencies of the two or more halftone screens.

19. The printing apparatus according to clam 18, step a) further comprising:
identifying one or more of the process direction and cross-process direction excitation frequencies associated with the image rendering device.

20. The printing apparatus according to claim 17, step b) further comprising:
selecting the one or more halftone screens such that the fundamental frequencies of the one or more halftone screens are not coincident with at least one of the excitation frequencies.

21. The printing apparatus according to claim 17, wherein the halftone screens are non-orthogonal and selected to produce a substantially moiré-free halftone representation of the image.

22. The printing apparatus according to claim 21, wherein the method reproduces an image using an enhanced halftone screen set including N halftone screens for each of N respective colorants associated with the image rendering device, and step b) further comprises:
selecting a halftone screen set, the halftone screen set generated according to a method comprising:
defining rosette fundamental frequency vectors $V_{R1}$, $V_{R2}$ that satisfy a length and sum requirement to meet visual acceptability standards according to $|V_{R1}|>f_{min}$, $|V_{R2}|>f_{min}$, and $|V_{R1}\pm V_{R2}|>f_{min}$;
defining N halftone screens for colorants i =1, N, respectively possessing first and second frequency vectors ($V_{i1}$, $V_{i2}$), where no two screens possess identical fundamental frequency vector pairs; and
selecting fundamental frequency vectors for the N halftone screens according to $(V_{i1}, V_{i2})=(m_{i1}V_{R1}+m_{i2}V_{R2}, n_{i1}V_{R1}+n_{i2}V_{R2})$ for integer m's and n's, where at least one fundamental frequency vector or its conjugate must also satisfy one of the following: $V_{ik}=V_{R1}$, $V_{ik}=V_{R2}$, and $|V_{ik}|>2\max[|V_{R1}|,|V_{R2}|]$; so that the set of N different halftone screens used in combination produce moiré-free halftone output.

23. The printing apparatus according to claim 17, step a) comprising:

identifying the one or more excitation frequencies by performing one or more of receiving input from a user of the image rendering device, and analyzing test prints generated by the image rendering device.

24. The printing apparatus according to claim 17, step a) comprising:

identifying the one or more excitation frequencies by examining color image data associated with the image to identify repeated patterns.

25. The printing apparatus according to claim 17, wherein the method reproduces a color image using two or more halftone screens for two or more respective colorants associated with a printer, and step b) comprises:

selecting the two or more halftone screens such that the fundamental frequencies of the excitation frequencies substantially coincide with the harmonic frequencies of the two or more halftone screens, and the fundamental frequencies of the two or more halftone screens are not coincident with the excitation frequencies.

* * * * *